United States Patent [19]
Pape

[11] Patent Number: 5,236,115
[45] Date of Patent: Aug. 17, 1993

[54] PROCESS FOR THE MANUFACTURE OF A VISCOUSTORSIONAL VIBRATION DAMPER

[75] Inventor: Rolf Pape, Berlin, Fed. Rep. of Germany

[73] Assignee: Carl Hasse & Wrede, Berlin, Fed. Rep. of Germany

[21] Appl. No.: 881,268

[22] Filed: May 11, 1992

[30] Foreign Application Priority Data

May 10, 1991 [DE] Fed. Rep. of Germany ....... 4115423

[51] Int. Cl.⁵ .............................................. F16F 7/10
[52] U.S. Cl. ....................................... 228/170; 72/71; 228/184
[58] Field of Search ............. 72/71; 29/173; 228/170, 228/184; 74/574

[56] References Cited

U.S. PATENT DOCUMENTS

| | | | |
|---|---|---|---|
| 4,056,291 | 11/1977 | Kraft et al. | 384/537 |
| 4,386,728 | 6/1983 | Torok et al. | 228/184 X |
| 4,532,786 | 8/1985 | Schaible | 72/71 X |
| 4,953,778 | 9/1990 | Critton et al. | 228/184 X |

Primary Examiner—Kenneth J. Ramsey
Attorney, Agent, or Firm—Pollock, Vande Sande & Priddy

[57] ABSTRACT

For a torsional vibration damper, whose working chamber, formed by an inner shell (17), an outer shell (19), a rear wall (15) and a cover (13) is provided to receive a seismic ring and viscous damping liquid (1), the housing body (1) bearing the working chamber is made by a metal forming process in a spinning lathe, starting from a round steel blank (17), which is clamped between mandrel bodies within the spinning lathe, and is split into two blank sections (31, 33) which receive the contour of the cylindrical inner and outer shell (17, 19) defining the working chamber (5) of the damper by subsequent forming.

3 Claims, 1 Drawing Sheet

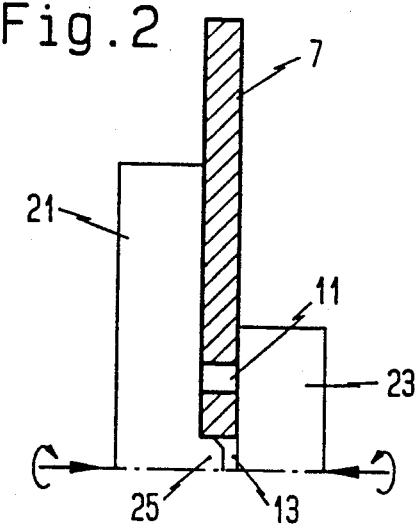
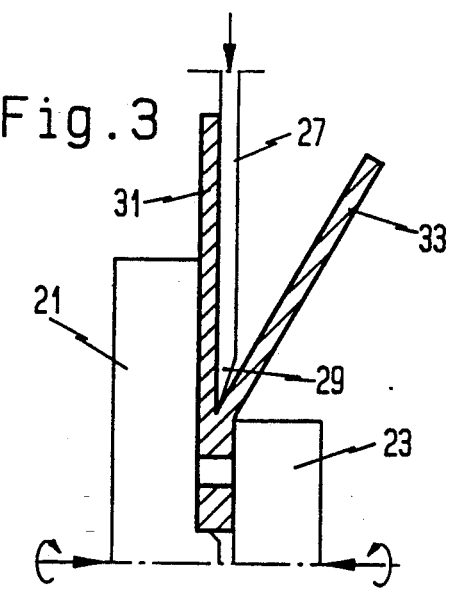
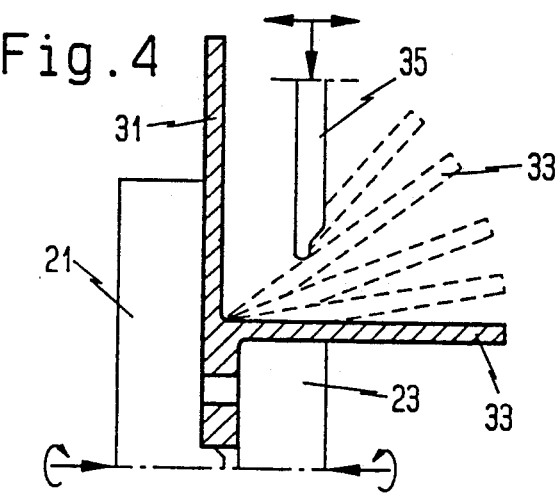
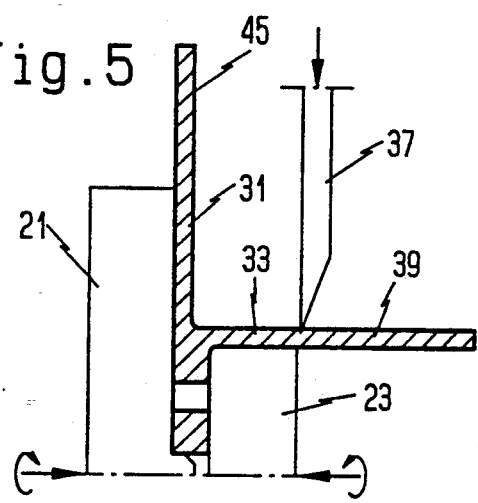
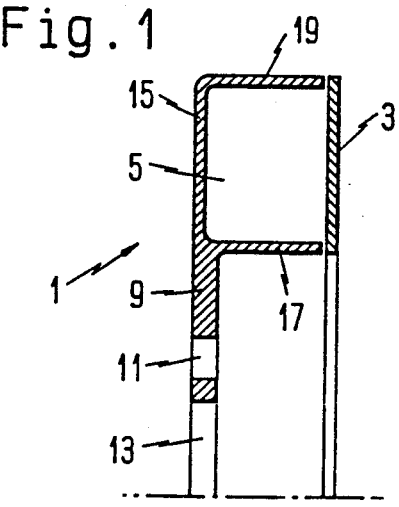
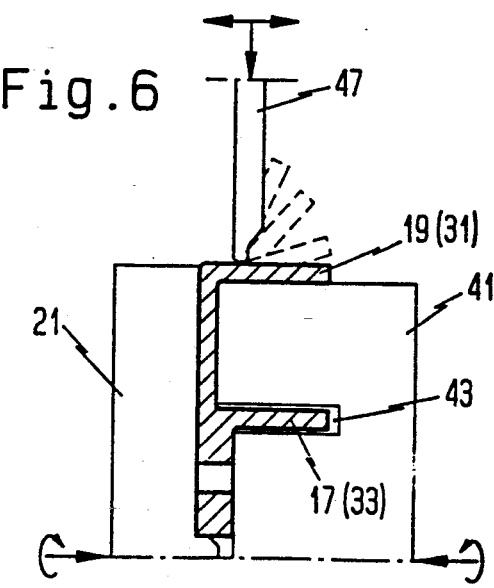

PROCESS FOR THE MANUFACTURE OF A VISCOUSTORSIONAL VIBRATION DAMPER

FIELD OF THE INVENTION

The invention relates to a process for manufacturing a torsional vibration damper and to a torsional vibration damper manufactured by such process.

BACKGROUND OF THE INVENTION

Viscosity torsional vibration dampers exist in a variety of designs; similarly, various techniques are known for making such dampers. During manufacture, a housing body is generally formed which includes a working chamber for receiving a seismic ring and a viscous damping medium. A cover, which is connected to the housing body, e.g., by welding, following manufacture of the housing body, is provided as another component. The viscous working medium is introduced through an opening in the cover into the working chamber, containing an inserted seismic ring, and the opening in the cover is closed again when the working chamber is filled. In this manner, finished torsional vibration dampers are used in a number of ways to damp machine parts rotated by torsional vibration; e.g., they are screwed to a crankshaft to be damped or fastened to the crankshaft in some other manner.

To date, torsional vibration dampers of the aforementioned design and mode of operation were made of cast iron or rolled steel in deep-drawn or welded design, so that mechanical refinishing to produce the desired dimensions was necessary in every case. Furthermore, so-called hydroforming techniques were developed (U.S. Pat. No. 3,512,612), which, however, include rather crude tolerances and as a consequence the use of damping media of unusually high viscosity.

The development of modern work techniques, also applied, e.g., in the fabrication of coupling housings (U.S. Pat. No. 4,056,291) also led in the case of damper housings to methods of manufacture where housing bodies for torsional vibration dampers can be manufactured with extremely high accuracy by means of high speed metal forming machines (EU-A-O 302 283). The general feature of the manufacturing process using modern metal forming machines is the supposed elimination of costly refinishing work; in particular, very high productivity is said to be obtainable while maintaining the narrowest tolerances. Spinning or metal forming methods of this kind include the use of mandrel bodies (tensioning mandrel and spinning mandrel) between which the starting material is clamped as a round steel blank made of cold- rolled, killed steel sheet in a spinning lathe. On the spinning lathe the round steel blank is shaped into a deep pot, whereby the outer shell of the pot, which belongs to the shearing surfaces in the damper housing, is given a pre-polished, cold-hardened surface. On another pair of mandrel or core bodies, the pot shell is subsequently spun, thus worked, into the shape of the damper housing. Subsequently an abutment for the damper cover, which is connected in an oil-tight manner to the housing body by laser-beam welding, heat sealing or with sealing rings by means of spot welding, is molded on.

The foregoing process of manufacture requires at least the use of two pairs of mandrel bodies, if, starting from a round steel blank, a deep pot and from this subsequently the damper housing is spun or formed. The forming of the housing into the shape of the working chamber presupposes that the spinning rollers can change directions at least twice during forming; because of the tendency of the plate steel to spring back, this is problematic with respect to the demand for dimentionally accurate housing bodies.

Damper housings made by such a method (EU-A-O 302 283) have a structure in which the cover extends parallel to the radial inner attachment flange of the housing body and is connected to it, e.g., by welding. Both the cover and the attachment flange comprise aligned partial circles of bores receiving the attachment screws by means of which the damper is to be attached to a machine part to be damped.

SUMMARY OF THE INVENTION

Starting from this point of departure, the object of the invention is to provide a process of manufacturing a torsional vibration damper which contributes to the further development of the metal forming or spinning process, that the required effort, in particular as regards the demanded changing of tools and necessary clamping, can be reduced. In particular, it is intended to determine the final contour of the housing body by simple process steps and without the need for time-consuming forming of the core or mandrel bodies, so that preferably no mechanical refinishing is required. The use of such a metal forming or spinning process is also to make it possible to design an attachment flange of adequate structural strength, and thus to obviate the supporting stripping off by means of a cover body. This also facilitates the choice of a cover design which is restricted exclusively to the dimensions of the actual working chamber of the damper housing. The invention also relates to a formed torsional vibration damper made by the foregoing process.

By applicant's process, which includes dimensioned splitting of the round steel blank as a substep, it is possible to make do with only two clampings of the mandrel bodies using a total of only three mandrel bodies. The use of a mandrel body to form in two directions also becomes superfluous, as well as the use of relatively complicated guides and controls for the spinning rollers, since the section of the round steel blank forming the inner shell of the working chamber is cut out of it in the course of a splitting operation, and consequently U-shaped, two-fold forming by means of a spinning roller following the change in direction is not required. Since the wall thickness of the found steel blank can be dimensioned in such a manner that the wall thickness required in the region of the attachment flange is specified, it obviates reinforcement of the attachment flange, e.g., by affixing a cover.

BRIEF DESCRIPTION OF THE DRAWINGS

The invention will now be explained by way of example with reference to the accompanying drawings.

FIG. 1 is a halved sectional view of the housing body of the torsional vibration damper manufactured by the process according to the invention.

FIGS. 2 to 6 are schematic sectional views showing the steps of the process of the invention for manufacture of the housing body shown in FIG. 1.

DESCRIPTION OF PREFERRED EMBODIMENT

FIG. 1 is a halved sectional view of a torsional vibration damper, which comprises a housing body 1 and a cover 3 to be connected to the housing body; it involves a viscosity torsional vibration damper of the type that functions according to the shear film principle with a working chamber 5, which is formed on the housing body 1 and in which a conventional seismic ring or rotation ring (not shown) is located.

The housing body 1, which will be explained with reference to FIGS. 2 to 6, is made of a round steel blank 7 (FIG. 2) preferably made of a cold-rolled plate steel. It can be, for example, a fine sheet body of suitable thickness made of killed steel with a low aluminum content. However, the invention is not restricted to specific material compositions of such round blanks, but can also be realized with any material which can be subjected to the process explained below.

As shown in FIG. 1, housing body 1 has a radially extending attachment flange 9, on which bores 11 for attachment screws (not shown) and a central bore 13 are provided on a graduated circle. The rear wall 15 of the working chamber, which is defined on the inside by a cylindrical inner shell 17 and radially on the outside by a cylindrical outer shell 19, radially delimits the attachment flange. With the aid of bores 11 and the attachment screws (not shown) the torsional vibration damper is attached to a rotating machine part to be damped, e.g., to an automobile crankshaft. In place of attachment screws, other connecting elements can also be provided. The central bore 13 acts as a centering bore for the manufacturing process to be described, and can also serve to receive a centering shoulder of the machine part to be damped. As shown in FIG. 1, the attachment flange 9 is thicker than the rear wall 15; this contributes to a stable construction of the damper housing, in particular with respect to the dynamic loads.

The housing body, shown partly in section in FIG. 1, is manufactured, according to the invention, with a metal forming or spinning machine, without requiring the use of complicated and thus expensive tensioning and spinning mandrels on the metal forming machine. The starting material of the housing body is formed in a known manner from a round steel blank 7, which can be stamped or manufactured by laser cutting. Strips which are divided into squares are cut out of a sheet plate having a thickness of, e.g., 8 mm. Round blanks with an inner hole are cut out of these squares; the graduated circle bores can also be machined into the round steel blank during this process step.

In the first operation, the round steel blank 7 is clamped between the mandrels 21 and 23 of a spinning lathe, one of the mandrel bodies acting in a known manner as a spinning mandrel. As shown in FIG. 2, a centering shoulder 25, which reaches into the central bore 13 of the round steel blank and fixes it in position on the spinning lathe, is provided on the mandrel 21. The two mandrels are put into rotation with reciprocal bracing, whereupon, as shown in FIG. 3, a splitting operation is completed on the material of the round steel bank in another process step. To this end, while mandrels 21 and 23, which clamp the round steel blank, are rotating, the sharply tapering cutting edge 29 of a cutting roller 27, which is also rotating, is pushed into the material of the round blank, so that in the course of the splitting operation a radially extending blank section 31 and another blank section 33, split off by means of the shaping of the cutting edge, are formed. The cutting depth of the cutting roller is preferably adjusted to the radial reach, i.e., the outer circumference of the mandrel 23, so that the blank section 33 can be formed relative to the outer circumference of the mandrel in the manner shown in FIG. 4. This is done with the aid of a rotating spinning roller 35, which acts on the inner side of the blank section 33 after the cutting roller 27 is withdrawn, whereby radially inwardly directed forces and axial forces are used in a known manner during this spinning operation, until the blank section is formed on the outer circumference of the mandrel 23. The mandrel 23 acts as a so-called spinning mandrel, where the metal forming takes place. Owing to the sequence of metal forming steps shown in FIGS. 3 and 4, the inner wall of the working chamber 5 is fixed without the use of a complicated mandrel body, and, following the tool change shown in FIG. 5, excess material of the blank section 33 is knocked off in a further step. This is done with a cutting roller 37, which is also preferably rotating and which can be made effective in a position corresponding to the thickness dimension of the mandrel 23, exerting pressure, directed radially inwardly, on the blank section 33. The projecting part 39 of the blank section is thereby severed in a simple manner.

At this stage a clamping change, i.e., in which the mandrel 23 is replaced by a mandrel 41, which serves as the spinning mandrel, follows the process step described with reference to FIG. 5. As shown, the mandrel 41 has a shape adapted to the already existing contour of the semi-finished tool. Accordingly, the mandrel 41 has a recess 43 which is adapted with precision to the dimensions of the part provided as the inner shell 17 for the finished housing body. In the same manner as in the working steps described above, the mandrels 21 and 41 exert during simultaneous rotation a clamping force relative to the semi-finished tool, the part 45 of the blank section 31 which projects beyond the radial outer dimension of the mandrel 21 (FIG. 5) being formed on the outer circumference of the mandrel 41 by a further spinning roller 35 in the manner shown in FIG. 6, in such a manner that the outer shell 19 of the housing body 1 is produced. The manufacture of the housing body 1 is now substantially completed, only a single exchange of one of the mandrel bodies having been necessary during the transition from the process step according to FIG. 5 to the process step according to FIG. 6.

In succeeding process steps, the front surfaces of the housing can be surfaced, and it is possible to bore the graduated circle bores which receive the attachment screws, if this has not already been done when the round steel blank was cut out.

To finish the torsional vibration damper, other well-known process steps follow. These include the insertion of the seismic mass or rotating ring into the working chamber 5 of the housing body, whereupon the cover that was stamped out beforehand to accurate dimensions is placed on the open side of the housing body 1 (FIG. 1). The cover 3 is attached by laser-beam welding, heat sealing or by sealing rings with spot welding, in each case producing an oil-tight connection. The cover comprises at least one previously bored filling hole for silicone oil in a position opposite the working chamber 5, so that following attachment of the cover the silicone oil can be poured in. Filling can proceed while a vacuum is simultaneously applied to another opening in the cover. After an adequate quantity of viscous damping medium has been filled into the working chamber 5, the short filling or vacuum pipe is removed, whereupon the openings provided for filling and applying the vacuum are plugged with a suitable weld plug or the like.

The invention is not restricted to the individually reproduced embodiments of the housing body of a torsional vibration damper; i.e., the teaching intrinsic to the manufacturing process concerning the use of splitting as a substep in connection with the subsequent spinning-forming can also be applied to the construction of torsional vibration dampers of greater complexity. It is also possible to design such torsional vibration dampers simultaneously as belt pulleys. For such a design, the outer circumference of the outer shell 19 of the housing body serves for so-called multiple-wedge profiles, well-known, e.g., for poly-V-belt pulleys. Torsional vibration dampers with such an additional function as belt pulleys are provided in particular for use in the automobile industry.

I claim:

1. Process of manufacturing a housing body of a viscous torsional vibration damper, comprising the steps of
   (a) clamping a round steel blank between two mandrels of a spinning lathe, said mandrels having different radial reach;
   (b) entraining said steel blank in rotation with said mandrels;
   (c) dividing a segment of a radial reach of said round steel blank starting from its outer circumference, by means of a rotating cutting roller that moves radially inwardly in the direction of the round steel blank, into two blank sections having the shape of annular disks connected to each other at a cleavage base thereof;
   (d) bending one of said blank sections in the direction of the mandrel body having shorter radial reach;
   (e) forming said blank sections on said spinning lathe into a working chamber of said housing body, said forming being done on an outer contour of the mandrel body having a radially shorter reach, while the blank section facing the mandrel body having a radially longer reach remains in its radial reach during the dividing step;
   (f) unclamping said housing body;
   (g) inserting a seismic ring into said working chamber;
   (h) welding an annular, stamped out cover to an open side of said working chamber;
   (i) filling viscous damping medium into said working chamber through an opening in said cover; and
   (j) plugging said opening.

2. Process as claimed in claim 1, wherein the blank section applied following cleavage on the outer contour of the mandrel body having a radially shorter reach is formed perpendicularly to said steel blank by a spinning roller, a portion being severed from said blank section by a second cutting roller, whereby the blank section remains as the inner shell of said working chamber of said housing body.

3. Process as claimed in claim 2, wherein, after a projecting portion of said blank section has been knocked off, the mandrel body bracing said blank section during forming is replaced by a mandrel body that receives said blank section, extending perpendicularly to said steel blank, in a recess and has such radial reach that a radially remaining blank section is formed on an outer circumference of said mandrel by means of a spinning roller, to form the outer shell of said working chamber.

* * * * *